United States Patent [19]

Dunbar

[11] Patent Number: 4,898,770
[45] Date of Patent: Feb. 6, 1990

[54] PROCESS FOR PRODUCING PREFORMABLE CONTINUOUS STRAND MATS USING A MIXTURE OF THERMOSETTING AND THERMOPLASTIC RESIN

[75] Inventor: Sidney G. Dunbar, Granville, Ohio

[73] Assignee: Owens-Corning Fiberglas Corporation, Toledo, Ohio

[21] Appl. No.: 35,523

[22] Filed: Apr. 7, 1987

[51] Int. Cl.$^4$ ............................................. B32B 5/02
[52] U.S. Cl. .................... 428/283; 156/166; 156/181; 156/296; 156/309.6; 264/136; 65/4.4; 428/290; 428/406
[58] Field of Search .............. 156/62.2, 181, 309.6, 156/311, 180, 166, 167, 228, 296; 264/280, 137, 136; 427/389.8; 65/4.4, 3.4, 3.43, 3.44, 10; 428/289, 290, 283, 406

[56] References Cited

U.S. PATENT DOCUMENTS

| | | | |
|---|---|---|---|
| 3,437,508 | 4/1969 | Gorski | 65/3.4 X |
| 3,621,092 | 11/1971 | Hofer | 264/120 X |
| 3,684,645 | 8/1972 | Temple et al. | 156/166 X |
| 3,713,962 | 1/1973 | Ackley | 264/136 X |
| 3,737,352 | 6/1973 | Avis et al. | 156/181 |
| 3,850,723 | 11/1974 | Ackley | 156/228 X |
| 3,865,661 | 2/1975 | Hata et al. | 156/79 |
| 4,016,318 | 4/1977 | DiGioia et al. | 428/95 |
| 4,026,478 | 5/1977 | Albert et al. | 65/10 X |
| 4,044,188 | 8/1977 | Segal | 156/62.2 X |
| 4,098,943 | 7/1978 | Digginger | 156/324 X |
| 4,615,717 | 10/1986 | Neubauer et al. | 264/137 X |

FOREIGN PATENT DOCUMENTS

| | | | |
|---|---|---|---|
| 0001573 | 1/1976 | Japan | 156/309.6 |
| 0056822 | 4/1983 | Japan | 156/309.6 |

*Primary Examiner*—Robert A. Dawson
*Assistant Examiner*—Jeff H. Aftergut
*Attorney, Agent, or Firm*—Patrick P. Pacella; Catherine B. Martineau

[57] ABSTRACT

A process for forming a continuous strand preformable mat is disclosed which consists of applying a binder matrix material which includes a thermosetting polyester binder material and a thermoplastic polyester binder to the continuous strand mat. The mat is heated such that the thermosetting binder material cures and hardens while the thermoplastic binder material softens and flows around strand intersections. The mat is thereafter cooled in order to solidify the thermoplastic polyester material of the binder matrix for additional handling for packaging and for subsequent handling by the customer. The preforms are made by heating the mat to over 200° F., placing in a cold mold, and then closing the mold to form and solidify the mat shape.

4 Claims, No Drawings

PROCESS FOR PRODUCING PREFORMABLE CONTINUOUS STRAND MATS USING A MIXTURE OF THERMOSETTING AND THERMOPLASTIC RESIN

BACKGROUND OF THE INVENTION

This invention relates to a process for producing continuous strand preformable mats. In one of its more specific aspects, this invention pertains to a process for producing mat preforms from continuous strand mat which is heated and then shaped by bending or drawing to a desired shape using shaping mold or screens. The mat is thereafter cooled which sets the shape so that the mat preform can be handled in subsequent molding operations.

Forming fiber reinforced mats into useful shapes is well known. Such shapes normally are relatively simple and are formed by placing a mat in a heated matched die mold having the final desired shape and adding a matrix resin. The production of continuous strand mat normally includes the application of a thermosetting polyester binder material to the continuous strands.

There has now been invented an improved process for the production of a continuous strand preformable mat which is especially useful for further molding operations.

This invention is directed to that improvement.

SUMMARY OF THE INVENTION

According to the present invention there is provided a process for producing preformable continuous strand mat. The present invention includes the use of a heat softenable binder system which allows the continuous strand mat to be readily shaped into a suitable preform. Also, according to this invention, there is provided an improved preformable continuous strand mat formed according to the process of the present invention which comprises a binder matrix including both a thermosetting polyester binder material and a thermoplastic binder material.

DETAILED DESCRIPTION OF THE INVENTION

The present invention relates to a process for producing a preformable continuous strand mat using a heat softenable binder system. The present invention further relates to a process for producing continuous strand mat "preforms", which mat may be heated in an oven or by heat lamps and then shaped by bending or drawing to a desired shape using shaping screens or molds. After shaping, the mat is cooled such that the shape or preform can be handled in subsequent molding operations.

This invention may be suitably practiced using the forming bushings, sizing and size application procedures which are currently being used for producing standard mats.

A binder matrix material is applied to the continuous strand mat using a traditional powder applicator. In preferred embodiments, the binder content ranges from about 3.5 to about 6.5 percent, by weight of the mat. The binder material is a combination of a thermosetting polyester binder material and a thermoplastic polyester binder material. In comparison, prior art processes for making continuous strand mats use 100% of a thermosetting binder; 100% thermoplastic binder is currently being used for producing chopped strand boat mats.

One suitable preformable mat produced according to the present invention uses a binder matrix of 80% thermoplastic polyester binder material and 20% thermosetting polyester binder. It is to be noted that the binder ratio may vary from about 90% thermoplastic/10% thermosetting to about 50% thermoplastic/50% thermosetting. In a preferred embodiment the ratio is approximately 80% thermoplastic binder material to 20% thermosetting binder material.

According to the present invention the mats containing the binder matrix material are heated such that the thermosetting polyester binder is cured and hardened while the thermoplastic polyester binder softens and flows around the strand intersections. Upon removal from the heat, the mat is then cooled which solidifies the thermoplastic polyester binder portion of the binder mixture.

The cooled thermoplastic binder and the curved thermosetting binder give the mat the necessary strength for additional handling for packaging and for subsequent handling by the customer. After the mat passes through the cooling section, the mat then passed through a set of compaction rollers. The gap is set wide enough so as not to compact the mat but yet sufficiently narrow enough to crush any glass inclusions (beads or chips) in order to prevent damage to the mold when the mat is processed in the molding operation. In a preferred embodiment, the gap is set at approximately 0.080 inches.

The mat formed according to the present invention is particularly useful in producing automobile bumper moldings since placing a mat in a mold can consume a major portion of molding time. The mat normally has to be placed by hand into the mold and tucked into corners and areas of curvature. A mat which has been formed on a flat conveyor retains its flat "memory" and resists bending to shape and often springs out of the mold or bends away from the desired shape. In contrast, a preformable mat formed according to the present invention, when set to the desired shape will retain that shape and will not spring out of the mold or bend away from the desired shape.

Further, the mat of the present invention may be heated by heat lamps or by a low temperature oven, thus reducing the cost of energy and capital equipment needed in other preforming processes.

According to the present invention, predrier heat is turned off and predrier fans are turned off so as to retain maximum moisture preferably in the range of 10-35%, for retaining binder particles. A similar effect of moisture retention may be obtained by applying a tacky sizing in forming and reducing moisture content to b 3–7% by using heat and air flow from the predrier fans.

Further, preforms made from preformable mats formed according to the present invention may be stacked or handled by robotic or mechanical equipment, thus reducing the labor required for handling of the preforms for mold loading or shipping.

Still another advantage of the present invention allows for production of preforms having a more complex shape and deeper "draws" because of the advantages of using a thermoplastic binder material in the binder matrix.

Changing the type of sizing to a sizing which would have sufficient tack to hold on the binder matrix material during the curing but at the same time not result in a continuous strand mat too stiff for preforming can be utilized with the process of the present invention. If a higher control of binder matrix material is desired, the use of finer split shoes, can be used to improve binder pickup on the mat.

The preform was produced by heating the mat to over 200° F., placing the mat in a cold mold, and then closing the mold to form and solidify the mat shape. In one embodiment the mat is heated to a temperature of between about 350° F. to 380° F. The process of the present invention allows a relatively thick continuous strand mat to be compressed into a thin molded shape having sufficient strength for good handleability.

It will be evident from the foregoing that various modifications can be made to this invention. Such, however, are considered within the scope of the claimed invention.

I claim:

1. A process for forming a continuous strand preformable mat having strand intersections and glass inclusions which consists of combining a thermosetting polyester binder material and a thermoplastic polyester binder material to form a binder matrix material; wherein the matrix material is present in a ratio of approximately 90% to 50%, by weight of the matrix material, thermoplastic polyester binder material to approximately 10% to 50%, by weight of the matrix material, thermosetting polyester binder material;

applying the binder matrix material to a continuous strand mat;

heating the continuous strand mat to a temperature in excess of 200° F. by placing the mat in a mold and then closing the mold to form and solidify the mat such that the thermosetting binder material cures and hardens while the thermoplastic binder material softens and flows around strand intersections of the continuous strand mat;

thereafter cooling the continuous strand mat in order to solidify the thermoplastic polyester material of the binder matrix material to form a cooled mat; and, passing the cooled mat through a set of compaction rollers set at a gap wide enough so as not to compact the mat but narrow enough to crush any glass inclusions present in the continuous strand mat.

2. The process according to claim 1, wherein the binder matrix material is present in a ratio of approximately 80 wt. % thermoplastic, polyester binder material to approximately 20 wt. % thermosetting polyester binder material.

3. The process according to claim 1 in which the mat is heated to a temperature of between about 350° F. to 380° F. such that the thermosetting binder material cures and hardens while the thermoplastic binder material softens and flows around strand intersections of the continuous strand mat.

4. The continuous strand mat formed according to the process of claim 1, wherein the thermoplastic polyester binder material is present in a ratio of approximately 80 wt. % to approximately 20 wt. % of the thermosetting polyester binder material.

* * * * *